Figures 3, 5:
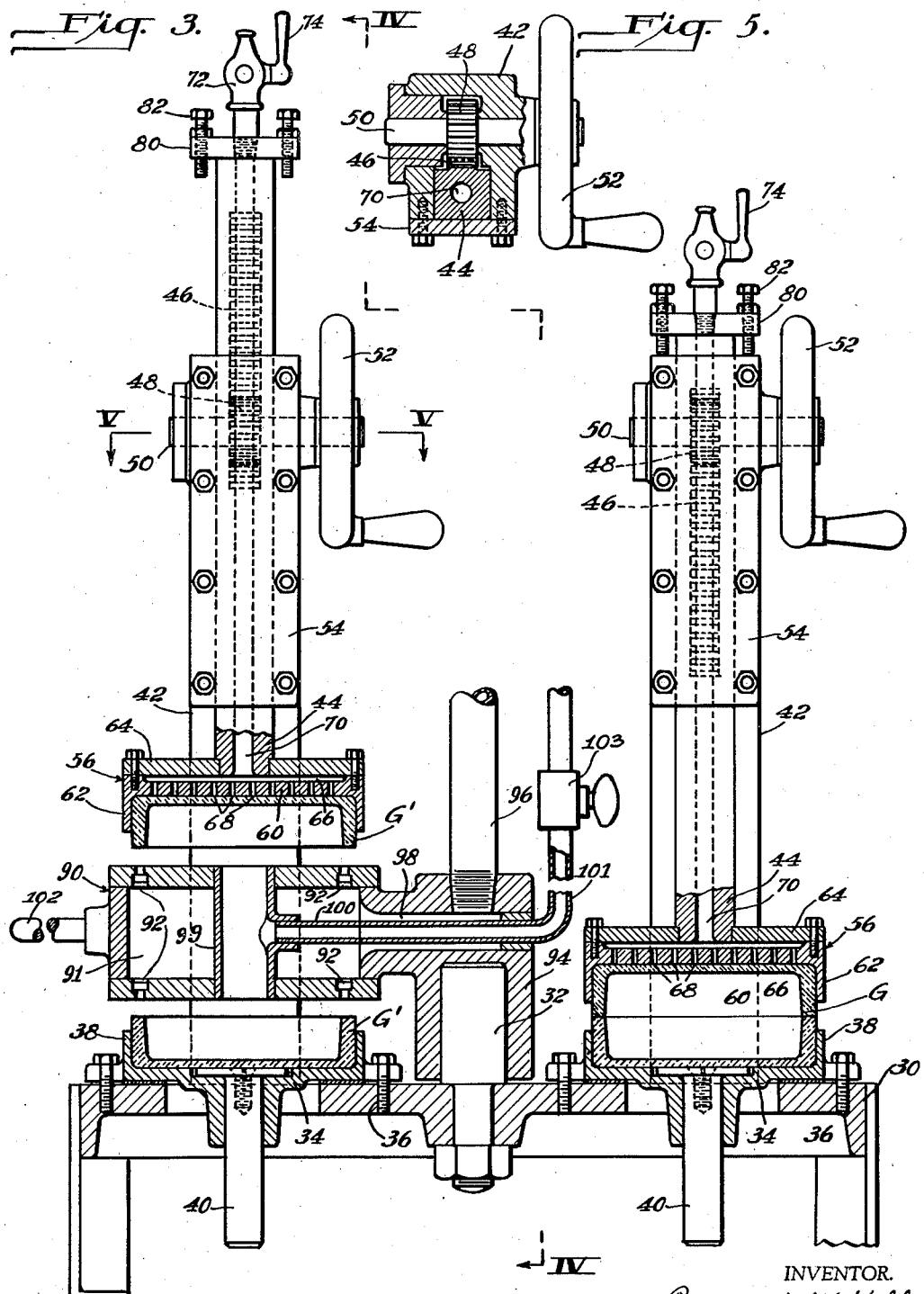

March 26, 1940. R. W. KELL 2,194,755
METHOD AND APPARATUS FOR MAKING HOLLOW GLASS BLOCKS
Filed Aug. 12, 1937 3 Sheets-Sheet 1
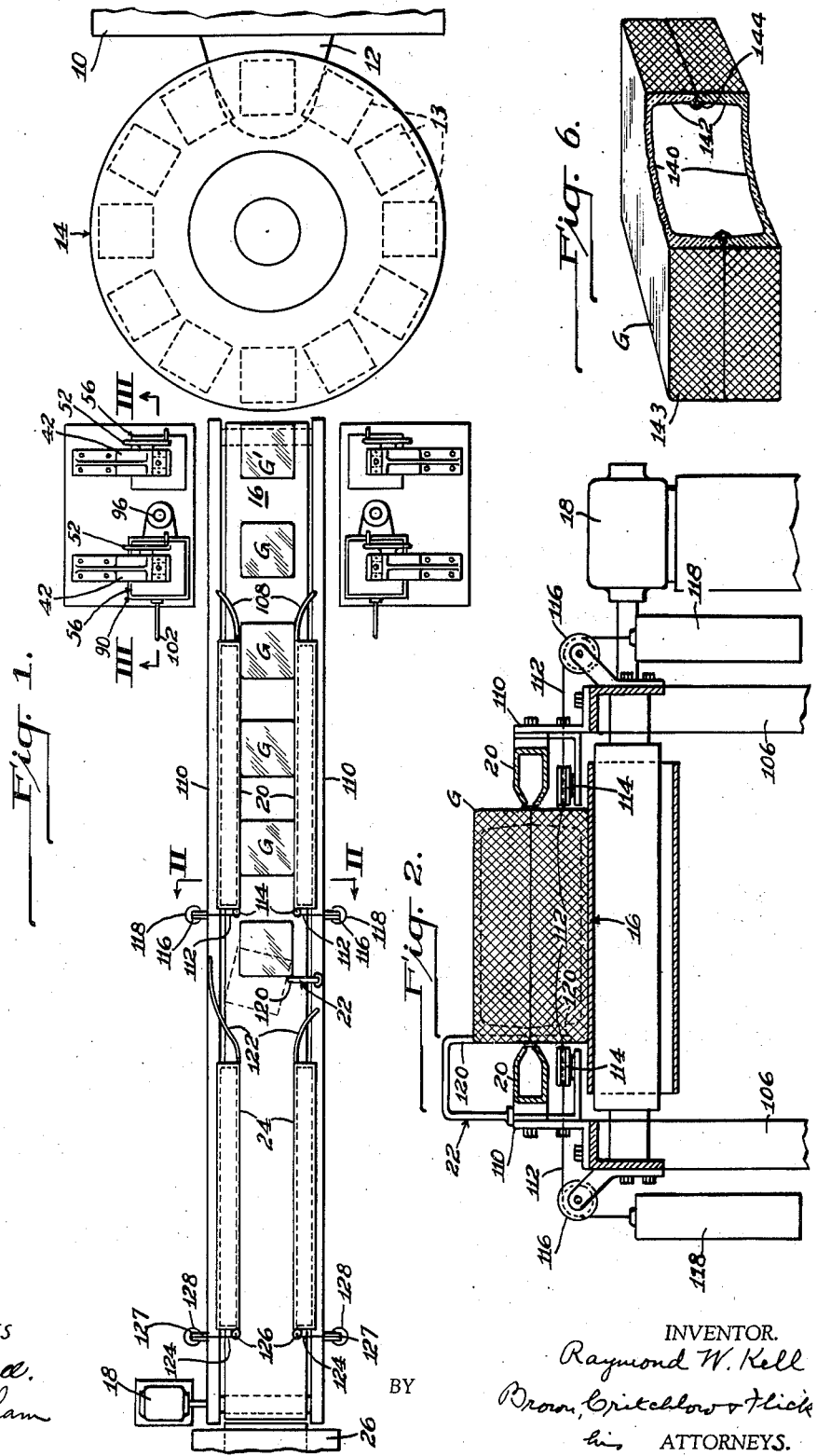
INVENTOR.
Raymond W. Kell
ATTORNEYS.

March 26, 1940.   R. W. KELL   2,194,755
METHOD AND APPARATUS FOR MAKING HOLLOW GLASS BLOCKS
Filed Aug. 12, 1937   3 Sheets-Sheet 2

INVENTOR.
Raymond W. Kell
BY Brown, Critchlow & Flick
his ATTORNEYS.

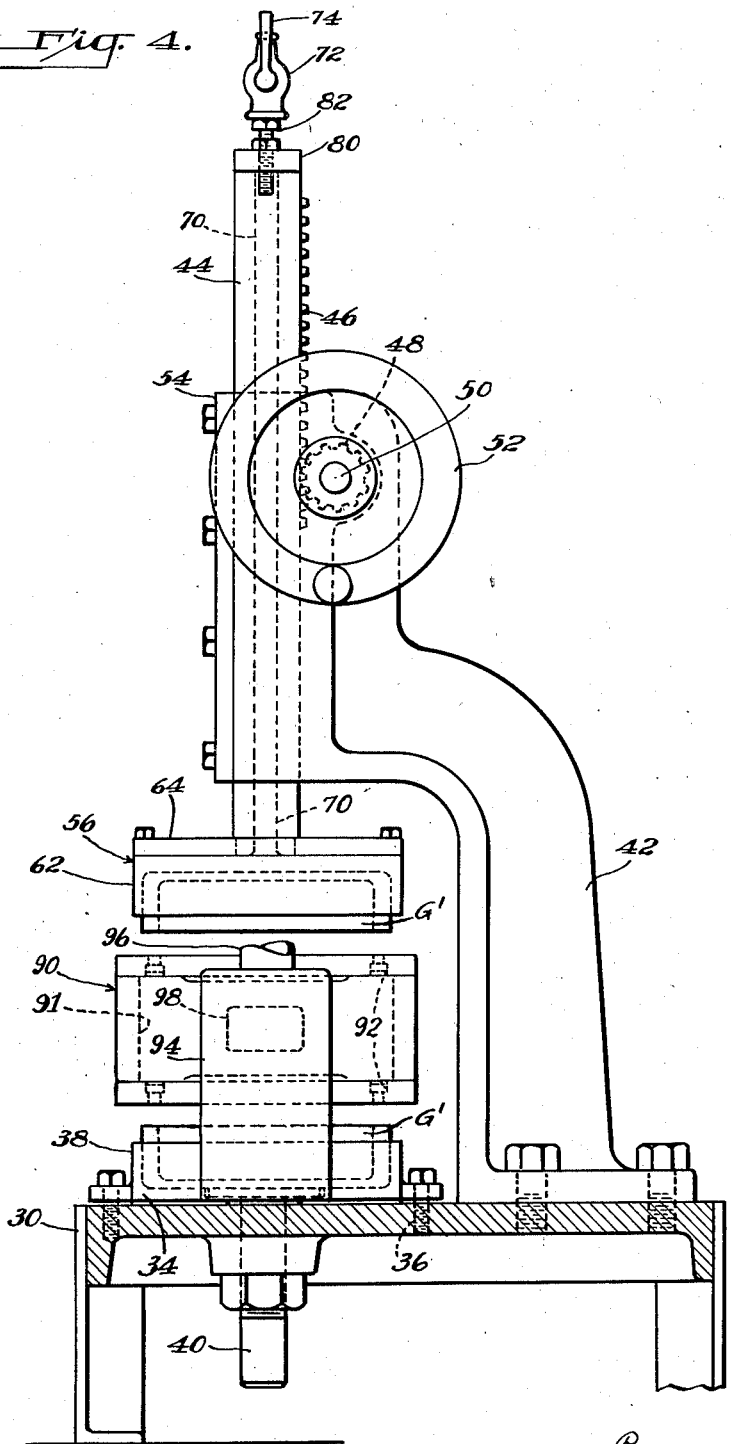

Patented Mar. 26, 1940

2,194,755

UNITED STATES PATENT OFFICE 2,194,755

METHOD AND APPARATUS FOR MAKING HOLLOW GLASS BLOCKS

Raymond W. Kell, Charleroi, Pa., assignor to Corning Glass Works, Corning, N. Y., a corporation of New York Application August 12, 1937, Serial No. 158,732

15 Claims. (Cl. 49—1)

This invention relates to the manufacture of hollow glass articles, as for example building blocks such as are now being used in increasing amounts in the construction of interior and exterior walls, partitions and roofs, and for other structures and parts of them, and has particularly to do with manufacturing such blocks or other glass articles by first forming parts of them, and then fusing the parts to each other.

Heretofore in the manufacture of hollow glass building blocks it has been proposed to press form the parts of a hollow glass block, usually in halves, heat the meeting edges of these parts, and stick the plastic meeting edges of the parts together under pressure to form a hollow block. I have found, however, that in heating the continuous meeting edges of hollow block parts the heat tends to concentrate at the outer corners or portions of the edges. The result is that the bead formed when the edges of the parts are pressed together is largest at the outside of the block which is often undesirable. Furthermore, the inside corners or portions of the meeting edges of the blocks may even after prolonged heating with the usual ring burner be so cool that the parts can not be pressed together to form a good tight joint. Again, the hot gases of combustion or otherwise must escape from the inside of the parts being heated so that the portion of the meeting edges adjacent the region of escape of the gases may not be as hot as the rest of the meeting edges and may even be in a completely solidified and relatively cool state.

Objects of my invention are to avoid and overcome the foregoing and other objections to and difficulties of known practices by the provision of improved methods of and apparatus for manufacturing hollow glass articles, as for example building blocks, to the ends that the meeting edges of article-forming parts may be uniformly heated and fused together to form a hollow article having strong joints, and that articles may be efficiently and economically formed.

The invention may be best explained by reference to the accompanying drawings, in which Fig. 1 is a plan view of one form of apparatus embodying and used in the practice of my invention; Fig. 2 a vertical transverse cross-sectional view to enlarged scale taken on line II—II of Fig. 1 illustrating mechanism for a final fusing operation; Fig. 3 a vertical sectional view to enlarged scale taken on line III—III of Fig. 1 showing details of the fusing mechanism; Fig. 4 a combined elevational and vertical sectional view taken on line IV—IV of Fig. 3; Fig. 5 a horizontal cross-sectional view taken on line V—V of Fig. 3; and Fig. 6 a perspective view, partly broken away, of a building block produced by my methods and apparatus.

General assembly of apparatus

While as above indicated I contemplate forming various hollow glass articles from preformed parts, my invention particularly contemplates the manufacture of hollow building blocks and accordingly has been so illustrated and will be so described. Referring to Fig. 1, molten glass from a forehearth 12 of a tank may be fed to molds 13 of a machine 14 which presses the molten glass into parts, such as half blocks G', which when assembled form complete hollow blocks. Positioned in alignment with the press, which is preferably automatic, there is a conveyor 16 of any desired type for carrying formed blocks to a lehr 26, the conveyor being driven by a motor 18. Adjacent the end of the conveyor near the glass press there are shown two units of apparatus for fusing the pressed halves together.

After the meeting edges of two halves G' are fused and assembled to form a complete block G, I may, if it is found desirable, provide a final step of further heating or fusing the line of joinder to smooth out any fissures, burrs or surface irregularities as will be understood by those skilled in the art. To do this the blocks on conveyor 16 may be first carried between burners 20 which effect a final fusing of two of their opposed sides. Positioned at the end of burners 20 there is an arm 22 for turning each block through 90° so that its other two opposed sides are exposed to additional burners 24, from which the blocks pass to a lehr 26. Usually, and in the preferred practice of my invention, the heating of the meeting edges of the half blocks G' and the pressing of these heated portions together provide a finished block, except for treating in the lehr, having a strong tight joint between its parts. However, on certain occasions, as where substantially all the burr formed at the line of joinder is inside the block, as hereinafter described, stress concentrations at the line of joinder are avoided by smoothing out any possible fissure by the burners 20 and 24.

The press 14 for forming the parts of the blocks G is of any suitable or desired type for rapidly and uniformly pressing the parts, and is therefore not illustrated in detail. Press forming makes possible the body parts being of the desired shape, thickness and design, and also makes it possible to provide them with various light-directing or -controlling elements.

Fusing apparatus

Figs. 3 to 5 illustrate one form of my improved apparatus for fusing the parts G' of hollow blocks G together. This apparatus includes a table 30 carrying an upright stud 32 for pivotally supporting a heater 90 so that it may be swung to and from registration with a holder 34, two of which are preferably equally spaced from the stud 32 and adapted to releasably receive press-formed glass parts G'. The holders 34 are secured to the table 30 by any suitable means, such as bolts 36, and are provided with upstanding flanges 38 for positioning parts G'. To facilitate removal of the parts after a fusing operation, the holders 34 may be provided with upwardly movable plungers 40.

Associated with each holder 34 is an upright bracket 42 (Fig. 4) attached to the table 30 for supporting a second or top holder in alignment with and movable toward and from the lower holder 34. This movement may be accomplished by the provision of a plunger 44 provided with a rack 46 which engages a spur gear 48 carried by a shaft 50 that is journaled in the bracket 42 and rotated by a suitable hand-wheel 52. The plunger 44 is received in a groove in bracket 42 and is held in sliding relation therewith by means of a cover-plate 54.

Secured to the lower end of plunger 44 there is a holder 56 adapted to releasably receive a glass part G'. This holder includes any suitable means for gripping a glass part, such as any well-known mechanical chuck, but is here shown as comprising a suction cup 60 having side flanges 62 and a backing plate 64 forming a manifold opening 66 which is connected to the interior of the suction cup 60 by a plurality of small openings 68. The manifold opening 66 is connected to an evacuator by providing the plunger 44 with a central passage 70, at the upper end of which is secured a valve 72 adapted to be connected to a suction line. Valve 72 may be operated manually by the handle 74 to release or hold the glass part G' in holder 56. The upper end of the plunger 44 carries a cross-head 80 which adjustably supports limiting screws 82 which engage with the top of the bracket 42 at the desired limit of the downward movement of the plunger.

As previously stated, the heater 90 is rotatably mounted on the centrally positioned stud 32 so that it may be swung between either pair of holders 34 and 56 for heating the edges of the parts G' to soften them. In the apparatus illustrated in Fig. 3 the heater is provided with a chamber 91 communicating with burner openings 92 in alignment with the flanges of the glass parts G' and mounted on a hub 94 journaled on the stud 32. Fuel is supplied to the chamber 91 through a conduit 96 secured to hub 94 and a passage 98 in the hub, as seen in Fig. 3.

A feature of my invention is to remove the products of combustion from the interior of the glass parts G' during and even after heating. I have found that when the products of combustion or other hot gases are not removed from within the burner and the glass parts that it is difficult to prevent the gases from either blowing outwardly or channeling through the ring of heating flame. If some portion of the ring of heating flame provided by the burner is slightly thinner or weaker than the rest, the hot gases at the inside of the glass parts pour through this portion of the flame and bend it away from engagement with the glass edge to be heated. Thus one portion of the edge of the glass part being heated may not be heated at all so that the glass parts can not be properly fused together. Or the hot gases may bend the entire ring of flame outwardly so that the outside corners of the meeting edges of the glass parts are most highly heated and the inside corners are relatively cool.

By controlling the amount of gas withdrawn from the interior of the burner and glass parts the engagement between the burner flames and the edges of the parts can be varied. When a considerable amount of gas is withdrawn the burner flames are bent slightly inwardly so that the inside corners of the edges of the glass parts are heated to the greatest extent. This is sometimes desirable so that, in pressing or fusing the parts or halves of the block together, little or no bead or burr is formed on the outside of the block, it being understood that the softer glass at the inside of the line of joinder forms a bead or burr largely on the inside of the block. Channeling out of the flame as heretofore described is eliminated and the meeting edges are uniformly heated throughout.

One manner of removing the products of combustion from the interior of the glass parts comprises the provision of a tube 99 in the burner 90 which tube extends from the upper to the lower surface of the center of the burner and is connected to a source of reduced pressure or vacuum by conduits 100 and 101 through suitable adjustable valve means 103. Instead of connecting the tube 99 and conduit 100 with a source of vacuum I may merely leave it open to remove or vent out the gases. In other words, I may allow for the dissipation of any built-up pressure inside the glass parts as they are being heated by venting the burner.

The heater 90 is provided with an operating handle 102 opposite its rotatable support so that it can be swung about the stud 32 into heating position between the flanges of the glass parts G' of any selected pair of supporting members 34 and 56. Thus, when one set of glass parts G' is being heated as shown at the left side of Fig. 3, another set of heated parts is being forced together as shown at the right side of Fig. 3, which operation will be more fully understood as the description proceeds.

Final fusing apparatus

The final fusing or smoothing-out mechanism as above explained is ordinarily not essential but is sometimes desirable and it is part of my inventive concept to provide it. Having particular reference to Figs. 1 and 2 of the drawings, the final fusing apparatus includes conveyor 16 supported by a frame 106, and associated burners 20 positioned longitudinally thereof and spaced a sufficient distance apart to allow the hollow glass blocks G to pass between them. The blocks G placed on the conveyor 16 after leaving the fusing apparatus pass between the burners 20, being guided into the desired position between them by suitable guides 108 secured to the end of the burners 20. The burners 20 are supported by brackets 110 connected to the frame 106 of the conveyor, and are positioned as shown in Fig. 2 so as to direct a fusing or smoothing-out flame against the line of joinder of the block parts. To further center the glass blocks G during this final fusing operation, preferably flexible longitudinally extending guiding means, such as wires 112, are employed. Each wire may be fastened at one end to one guide 108, carried over pulleys 114 and 116, and connected at its other end to a weight 118 so that the wires are positioned to engage the sides of the glass blocks below the burners. The length of the burners 20 and the speed of the conveyor 16 are so related that by the time the glass blocks have passed between the burners the sides exposed to the burners are subjected to a final heating action without being rendered sufficiently plastic to cause distortion of the blocks. This eliminates surface irregularities, such as fissures, and in general smooths out any portions of the seam which might cause stress concentrations.

After passing the burners 20 the glass blocks G are rotated through 90° so that the line of joinder of their other sides may be subjected to a final heating action. This rotation of the blocks may be done manually, although the invention contemplates performing it automatically. To this end there are provided turning means 22 comprising a post 120 mounted on the conveyor frame 106 in vertical alignment with the corner of a block as it leaves the burners 20. Engagement of the corner of the glass block with the post 120 in the normal forward movement of the block turns it substantially through 90° as is illustrated in Fig. 1 in dotted lines.

The burners 24 for effecting the final heating of the line of joinder of the glass parts are mounted on the conveyor frame 106 like burners 20. Guides 122 are secured to the ends of the burners for completing the turning of the blocks and for guiding them properly between the burners. To assist in centering the blocks during the final heating operation wires 124, pulleys 126 and 127 and weights 128 are preferably employed as above described with reference to the burners 20. After leaving the burners 24 the glass blocks pass to the lehr 26, which may be of any suitable type to properly anneal the blocks.

*Operation of apparatus and method*

In the operation of the apparatus and in the practice of the method, gobs or gathers of glass are fed from the forehearth 12 into the molds of the press 14 where they are formed into body parts having face portions usually bounded by continuous flanges. While the pressed body parts are still very hot they are removed from the pressing apparatus and placed in the holders 34 of the fusing apparatus. If found more convenient the glass parts may be placed on the conveyor 16 and taken from there as needed by the operators of the fusing apparatus.

As will be seen from reference to Figs. 3, 4 and 5, in the fusing apparatus the edges of the extending flanges of the glass parts G' carried in one pair of holders 34 and 56 are heated to a fusing temperature by the heater 90, while the products of combustion are withdrawn by the conduit 101. By adjusting the valve 103 the amount of gas withdrawn can be regulated so as to provide the exact type of heating desired. Specifically, the edges can be heated uniformly or the heat can be concentrated at the outer or inner portions of the edges. In all events the heating is uniform completely around the block parts. After softening the glass edges as desired the heater 90 is quickly swung about its supporting stud 32 from between the holders and positioned to heat another pair of body parts in the second pair of holders 34 and 56. After the heater is so moved, hand-wheel 52 is rotated to move the plunger 44 vertically downward and thereby force the softened edges of the body parts into fused relation. The downward movement of the plunger is limited by the screws 82 so that while the parts are quite firmly secured together there is no objectionable upsetting of the edges of the glass during the operation such as would form heavy beads or burrs. The parts of the hollow glass body are thus fused together while hot from the pressing operation, and immediately after the edges thereof have been further heated by flames from heater 90.

As heretofore indicated the fused block is ordinarily passed directly to the lehr 26 on the conveyor 16 without a final fusing operation. To transfer a block G from the fusing apparatus to the conveyor 16 the holder 56, whose suction holds the block therein, is raised to its uppermost position. A transfer paddle is then placed under the block and the suction is cut off by operating handle 74 of valve 72, pursuant to which the glass body drops on the paddle and permits the operator to place it on the conveyor. In place of a paddle, tongs may be used to engage the sides of a block.

In case it is decided to effect the final fusing operation the burners 20 and 24 and associated mechanism are incorporated with the conveyor 16. In the operation of the final fusing apparatus the glass blocks on the conveyor pass to the burners 20 which heat opposite sides of the block along their line of joinder to effect a final smoothing thereof. The block is then turned by the means 22, or manually, so that the burners 24 heat the remaining sides along the line of joinder so that there is formed a very smooth integral fusion and seal, adapted to resist shock and changes in temperature under all working conditions. From the final burners 24 the glass blocks G pass through the lehr 26.

The various hand-transfer and handling operations may, of course, be performed by automatic transfer devices or by power means if it is advisable in certain installations to render the apparatus more automatic.

*The article*

The hollow glass building block G illustrated in Fig. 6 and referred to in the foregoing description is usually made about 6 inches square and 2½ inches thick. It is formed with substantially flat faces 140 having continuous integral flanges 142 surrounding the faces. The flanges 142 may have roughened or coated outer surfaces 143, and are preferably slightly thicker than the faces. As shown in Fig. 6, the flanges 142 are usually not materially upset during the fusing operation, but have only a slight upset or bead determined by the adjustment of the limit screws 82 and the manner of heating the flanges. There is not ordinarily any noticeable line of joinder between the glass parts, nor any roughness of the upset, and this is particularly true if the final fusing operation is employed. As heretofore stated the inside of the edges of the flanges are usually heated during the joining operation a greater amount than the outside flange corners by a controlled withdrawal of gas via conduits 99, 100 and 101. Thus when the parts are pressed together a distinct bead or upset 144 is formed on the inside of the line of joinder of the block while no such bead or upset is formed on the outside of the block at the line of joinder.

Summary

By my invention improved methods and apparatus are provided which avoid and overcome prior difficulties attending the manufacture and use of hollow glass articles. The apparatus herein disclosed is inexpensive in initial and maintenance costs and readily adapts itself to extensive commercial production of uniform and efficient glass bodies. My methods of manufacturing are likewise particularly adapted to continuous commercial operations and result in an improved article of manufacture which is relatively inexpensive and superior to similar known products.

Within the scope of my invention it is possible to retain at least certain of the advantages of it while practicing only parts of the whole. Particularly, I contemplate dispensing in certain instances with either the initial or final fusing operations. Likewise, the exact apparatus and method herein can be changed or varied to meet existing conditions. For example, I may hold the burner stationary and move the holders to and from the burner. This construction is particularly adapted for use with a standard turret-type automatic machine wherein the holders are positioned at a plurality of circumferentially spaced points on the turret bed and are revolved step by step to a loading station, one or more heating stations, a pressing or fusing station, and then to an unloading station. As indicated, one or more burners may be used to obtain the desired softening of the edges of the glass parts. It should, moreover, be specifically understood that although my invention has been described and illustrated in conjunction with the manufacture of hollow glass building blocks for which the invention is particularly adapted, I contemplate the use of my invention to make hollow glass articles of various kinds.

Therefore, while in accordance with the patent statutes my invention has been described and illustrated in detail, it should be appreciated that my invention is not limited thereto or thereby, but is defined in the appended claims.

I claim:

1. That method of manufacturing hollow articles of glass, which comprises press forming complemental parts each having a substantially flat portion and an endless upstanding flange, supporting the parts in spaced relationship but with their flanges in alignment, simultaneously directing flame against the flanges to soften them, withdrawing controlled amounts of gas from between the glass parts during the heating of the flanges to control the flow of heat to the flanges, immediately after heating bringing the parts together to stick the heated flanges against each other over their entire opposed surfaces, heating the line of joinder to fusing temperature by first heating opposed portions of the seam to fusing temperature, and then turning the parts through substantially 90° and completing the heating of the seam.

2. That method of manufacturing hollow building blocks of glass, which comprises press forming complemental parts each having a substantially flat portion and an endless upstanding flange, supporting the parts in spaced relationship but with their flanges in alignment, simultaneously heating the flanges to soften them, withdrawing gas from the interior of the parts during the heating of the flanges to control the flow of heat to the flanges, bringing the heated flanges together to stick the heated flanges against each other over their entire opposed surfaces, and heating the line of joinder of the parts to fusing temperature.

3. That method of manufacturing hollow glass articles, which comprises forming complemental parts each having a substantially flat portion and an endless upstanding flange, supporting the parts in spaced relationship, simultaneously heating the flanges to soften them, removing controlled amounts of gas from the space surrounded by the flanges during the heating thereof to control the flow of heat to the flanges, and immediately after heating bringing the parts together to fuse the heated flanges together.

4. That method of manufacturing hollow glass articles, which comprises forming complemental glass parts each having a substantially flat portion and an endless upstanding flange, supporting the parts in spaced relationship, heating the flanges to soften them, removing controlled amounts of gas from the space surrounded by the flanges during the heating thereof to control the heating of the flanges, and bringing the parts together to fuse the heated flanges to each other.

5. The method of manufacturing hollow glass articles, which comprises forming molten glass into body parts each having a substantially flat portion surrounded by a flange, positioning two of the parts so that the edges of their flanges are spaced apart, heating the edge portions of the flanges with a gas flame to soften them while withdrawing gas from within the area defined by the flanges in a sufficient amount to draw the gas flame towards the inside of the flanges so that these portions are most highly heated, and forcibly pressing the softened edge portions of the parts together to form a closed hollow body having a larger burr at the inside of the line of joinder than at the outside.

6. The method of making glass articles, which includes the steps of forming complemental body parts, heating the engaging portions of the complemental body parts with a flame to soften them, removing gas from points adjacent the body parts during heating to insure a uniform heating of the engaging portions, and sticking the parts of the body together by pressing the softened portions together a predetermined extent.

7. That method of making hollow building blocks or the like of glass, which includes the steps of forming complemental glass parts having upstanding endless flanges, heating the flanges with gas flames directed to engage with the flanges throughout their endless lengths, controlling the flow of the flame over the flanges, and insuring uniform heating of the flanges and absence of flame channeling by venting away gas from within the space defined by the flanges during the heating operation.

8. Apparatus for the manufacture of hollow bodies of glass from complemental body parts of glass having upstanding endless flanges comprising means for supporting the body parts with the flanges in alignment with each other, gas flame means for heating the flanges to soften them, means for withdrawing gas from within the space defined by the flanges during the heating operation, means for immediately pressing the softened portions of the body parts together a predetermined amount to form a closed hollow body, means for heating a portion of the line of joinder of the body parts to effect a final smoothing thereof, means for turning the hollow body, and means for heating and smoothing the remaining portion of the line of joinder of the body parts.

9. Apparatus for the manufacture of hollow bodies of glass from press formed complemental glass body parts comprising means for supporting the body parts, means for heating the engaging portions of the body parts to soften them, means for removing controlled amounts of gas from spaces adjacent the body parts during the heating operation, means for pressing the softened portions of the body parts together a predetermined amount to form a closed hollow body, and means for heating the line of joinder of the body parts.

10. Apparatus for the manufacture of glass bodies, comprising the combination of means for supporting complemental body parts having upstanding flanges, gas flame means for heating the flanges of the body parts to soften them, means for removing controlled amounts of gas from the space surrounded by the flanges during the heating operation to effect the desired play of the gas flame over the flanges and to prevent channeling of the flame, and means for pressing the softened portions of the flanges together in fused relation to form a sealed hollow block.

11. Apparatus for the manufacture of glass bodies, comprising the combination of means for supporting formed complemental body parts, means for heating the engaging portions of the body parts to soften them, means for venting away gas from adjacent the body parts during the heating operation, and means for pressing the softened portions of the body parts together a predetermined amount and in fused relation to form a composite body.

12. Apparatus for making hollow bodies or the like of glass including a holder for receiving a part of the body, a second holder positioned in alignment with the first for receiving another part of the body, means positioned between the members for simultaneously heating portions of the bodies, means for withdrawing gas from adjacent the body parts during heating to control the flow of heat over the parts, means for moving the heating means and the holders relative to each other so that the holders can be moved toward each other, means for effecting a relative movement between the holders whereby the heated portions of the bodies can be stuck together, and means adjustably limiting said holder movement so that the desired amount of sticking of the parts together is obtained.

13. Apparatus for making hollow blocks or the like of glass, including a holder for receiving a part of the block, a second holder for receiving another part of the block, heating means comprising gas burners for heating portions of the block parts, means to withdraw at least certain of the gases within the block parts to control the direction of the flow of the flames over the block parts, means for moving the heating means and the holders relative to each other so that the holders can be moved toward each other, and means for effecting a relative movement between the holders whereby the heated portions of the body parts can be stuck together.

14. The method of heating a part, such as a half, of a hollow glass body, which includes the steps of heating at least a part of the body with a substantially endless arrangement of gas flames to soften it over an endless portion, and controlling the direction and flow of the flame over the surface of the body by removing the products of combustion from within the substantially endless arrangement of gas flames.

15. The method of manufacturing hollow glass building blocks, which comprises forming complemental glass parts adapted when joined together to form a block, supporting the parts with the portions thereof to be engaged in spaced relationship, heating the portions to be engaged with gas flames, removing gas including products of combustion by a suction element disposed between the parts during the heating thereof, removing the suction element, and bringing the parts together to fuse the heated portions to each other.

RAYMOND W. KELL.